United States Patent [19]

Moore et al.

[11] 4,045,263

[45] Aug. 30, 1977

[54] CONTROL OF ROOFING PROCEDURE

[76] Inventors: Robert J. Moore, 614 Redman Ave.; Gerald B. Curtis, 50 Gill Road, both of Haddonfield, N.J. 08033

[21] Appl. No.: 551,094

[22] Filed: Feb. 20, 1975

Related U.S. Application Data

[62] Division of Ser. No. 311,743, Dec. 4, 1972, Pat. No. 3,882,475.

[51] Int. Cl.$^2$ .............................................. E04D 7/00
[52] U.S. Cl. .................................... 156/64; 156/71; 156/351; 156/359; 156/378; 156/322; 156/337; 165/11; 340/227 R; 427/8; 427/138
[58] Field of Search ............... 156/71, 359, 368, 378, 156/64, 351, 356, 359, 337, 322; 427/8, 138, 316; 62/125; 340/227 R; 116/DIG. 10, 101, 114.5; 236/94, 96; 165/11

[56] References Cited

U.S. PATENT DOCUMENTS

| | | |
|---|---|---|
| 2,937,779 | 5/1960 | Reustle .............................. 156/378 |
| 3,084,621 | 4/1963 | Guastavino ....................... 156/351 |
| 3,093,936 | 6/1963 | Figge .................................. 156/359 |
| 3,101,898 | 8/1963 | Mader ................................ 156/359 |
| 3,373,074 | 3/1968 | D'Eustachio et al. ............ 156/71 |
| 3,479,210 | 11/1969 | Ross .................................... 427/8 |

Primary Examiner—Edward G. Whitby

[57] ABSTRACT

A system of temperature determination and control for molten bituminous material during construction of built-up roofs is provided wherein a heating temperature is preselected based upon a number of factors and is adjusted insofar as may be called for upon checking the temperature upon application to the roof deck. Factors considered in the predetermination include type of bituminous material, type of roofing material, and deck type and temperature; ambient temperature, cloud cover, and wind speed; and also opportunities for cooling of the bituminous material between temperature-controlled and deck locations, during application to the deck, and thereafter until application of an overlying layer of roofing material.

9 Claims, 3 Drawing Figures

CONTROL OF ROOFING PROCEDURE

This is a division, of application Ser. No. 311,743, filed Dec. 4, 1972, now U.S. Pat. No. 3,882,475.

This application relates to a system for ensuring proper temperature of bituminous material in constructing roofs built-up of successive layers of roofing material adhesively secured together by intervening layers of bituminous material applied to each underlying layer of roofing material before application of the next overlying layer.

Molten bituminous material used in construction of built-up roofs may be either too hot or too cool to provide proper adhesion for successive layers of roofing material and, thus, detrimental to the useful life of the resulting roof. An ordinary roofer and his work product are at the mercy of conditions beyond his control so that if those conditions are deleterious to adhesive quality of the bituminous material or are otherwise not conducive to formation of a satisfactory roof, the results will be unsatisfactory. The substantial cost of a built-up roof, the marked difference in useful life of a good roof and a poor one, and the custom of bonding roofing performance militate in favor of a system to supersede the happenstance character of conventional roofing procedures.

A primary object of the present invention is systematic preselection of heating temperature for molten bituminous material to be applied in layer form to a roof deck in construction of a built-up roof.

Another object is control of such heating temperature so that such molten bituminous material applied to the roof deck will have a temperature within a satisfactory adhesion temperature range.

A further object is provision of apparatus for accomplishing the foregoing objects.

Other objects of this invention, together with means and methods for attaining the various objects, will be apparent from the following description and the accompanying diagrams.

In general, the objects of the present invention are accomplished, in formation of built-up roofs using layers of molten bituminous material to adhere layers of roofing material, by heating bituminous material to melt it and to maintain it at preselected heating temperature, sensing the temperature of the bituminous material undergoing heating and signalling any departure thereof from acceptable limits about the selected temperature, whereupon corrective measures will be taken, also sensing the temperature of the bituminous material applied in layer form to a roof deck, and adjusting the heating temperature in accordance with the respective sensed temperatures so that the molten bituminous material applied to the deck will be within satisfactory adhesion temperature range.

More particularly, in heating of molten bituminous material, the invention comprises preselecting a heating temperature between about 300° F and 500° F and signalling whenever the temperature thereof departs from such selected value by more than a tolerance of a given number of degrees in either direction. Factors taken into account in preselecting the heating temperature include material composition, the desired temperature being higher for asphalt than for pitch, higher for roofing material of high conductivity than for roofing material of relatively low conductivity, and higher for low deck temperature than for relatively high deck temperature; usually also ambient conditions, the desired temperature being higher for low ambient temperature than for relatively high ambient temperature, higher for high wind speed than for relatively low wind speed or calm conditions, and higher for cloudy than for clear sky on a warm day; and even other conditions conducive to cooling of the molten bituminous material after cessation of heating thereof, the desired temperature being higher for long elapsed time between heating of the bituminous material and application thereof to the deck than for relatively short lapse of time in unheated condition, higher for application thereof in numerous batches than in relatively continuous form, and higher in the event of undue delay in covering the applied bituminous material with roofing material than in the event of prompt covering thereof.

Figure 1:
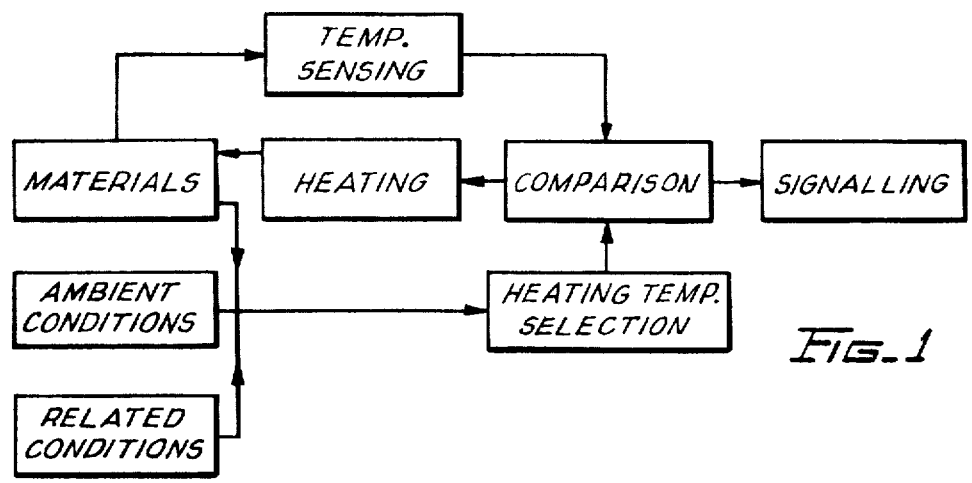
FIG. 1 is a schematic block diagram of a roofing system according to the invention.

FIG. 1 gives in block form an overview of the system of this invention. Items of information about the materials employed, the ambient conditions, and related conditions are combined to determine the temperature selected for heating of whatever bituminous material is being used. The direction in which the heating temperature is influenced by various material, ambient, and related conditions, including temperatures of certain of the materials, has just been mentioned. In practice, each such condition is quantified and is given due weight in construction of an index or analogous guide for control of the heating accordingly. The temperature of the bituminous material being heated is sensed and compared with the preselected temperature, any undue deviation therefrom being signalled, and the temperature of the bituminous material applied to the roof deck is sensed and is compared with the heating temperature, and the result of such comparison is used to control the heating of the bituminous material.

Figure 2:
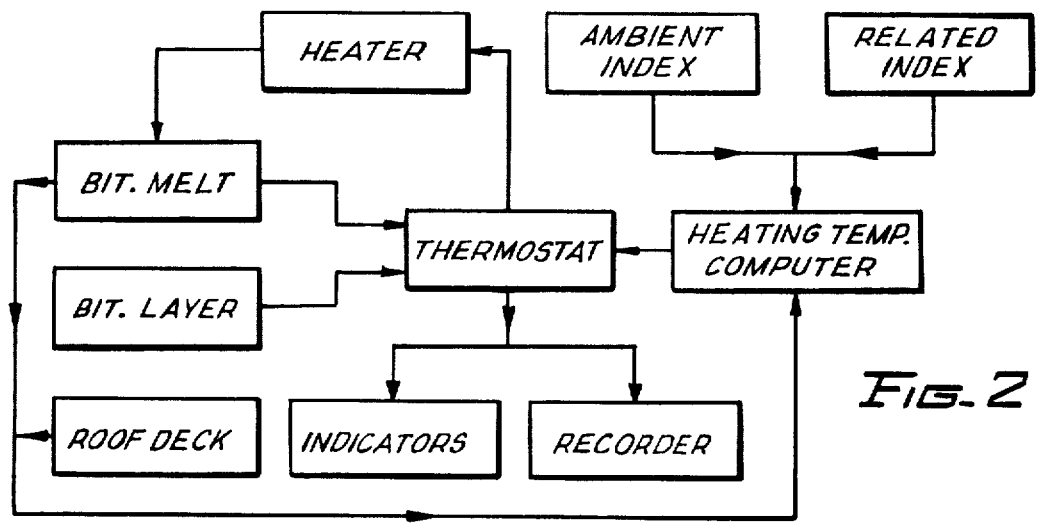
FIG. 2 is a schematic block diagram of part of the system of FIG. 1 in more detail.

FIG. 2 gives in block form more details of part of the system presented in process terms in FIG. 1. The ambient index and related conditions index are fed into a heating temperature computer together with information characteristic of the melt of bituminous material, the roofing material, and the deck upon which the materials are put. Thermostatic mechanism set for the computed temperature is responsive to temperature of the bituminous material in the heated melt. The thermostatic mechanism is subject to manual adjustment in response to sensing of the actual temperature of the bituminous material or is linked directly to means for sensing the latter temperature so that its set point is readjusted automatically in accordance with deviation of such temperature from satisfactory adhesion range. A control thermostat so composed controls the heater used to heat the bituminous material, as in conventional manner by setting a valve (not shown) to control flow of heating fuel to a burner type of heater or by impeding the flow of electrical current to a resistance heater, for example. The computer may be a more sophisticated digital device or even an analog computer programmed with what amounts to nomographs for the respective input conditions.

Suitable basic thermostatic mechanism is disclosed in Pflieger U.S. Pat. No. 3,103,818, which employs mechanical output linkage. Equivalent electrical (or even fluid) circuitry may be employed, with or without output amplifiers, servo units, or the like. The sensitivity of the thermostat is preferably adjustable so as to narrow or widen the tolerance limits within which deviation from a preset temperature is tolerated, i.e., does not effect any change in the heating. Departure of the sensed melt temperature beyond such a limit (either upper or lower) is fed back from the thermostat to the heater to alter the heating oppositely and thereby bring the melt temperature back within limits in due course. In addition, departure of bituminous layer temperature on the deck effects adjustment of the heating temperature to minimize departure thereof from satisfactory adhesion temperature via the thermostat. Suitable temperature-sensing means for such component is exemplified by the "gun" type of thermal sensor available from Raytek, Inc., Mountain View, California under the designation: "Raynger" Model R36CHS. Its connection to the rest of the thermostatic mechanism may be effected through conventional servo means for readjustment purposes.

Figure 3:
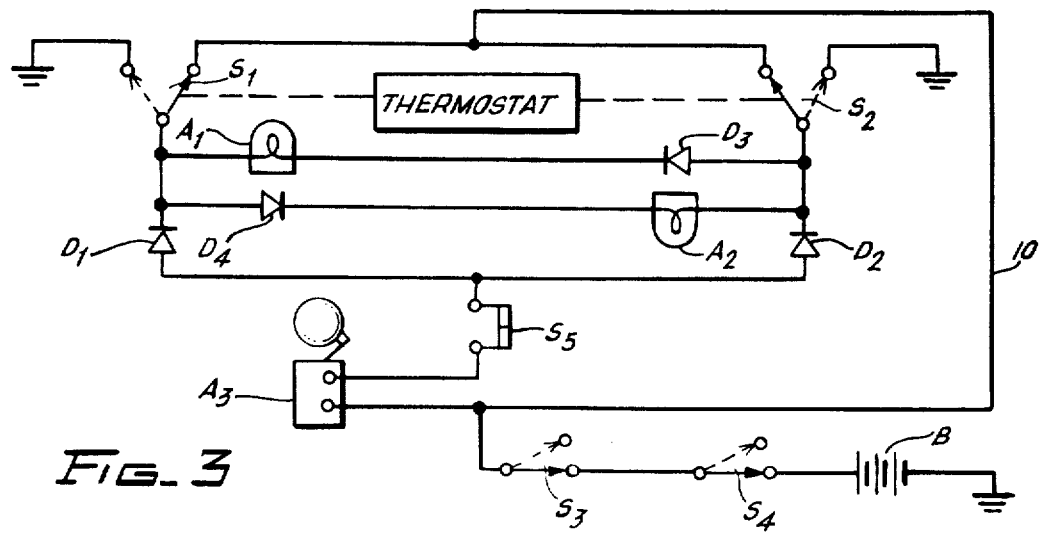
FIG. 3 is a schematic circuit diagram of apparatus useful in part of the system.

FIG. 3 shows actual circuitry suitable for signalling departure of the melt temperature from preset limits about the heating temperature preselected as set forth above. The thermostat moves the arms of lower and upper limit switches $S_1$ and $S_2$, which are shown as being of single-pole, double-throw (preferably snap-action) type. The illustrated position (solid lines) of the switch arms corresponds to heating temperature between the upper and lower temperature limits, whereas the alternative positions (broken lines) correspond to out-of-limits temperatures. The left contact of $S_1$ and the right contact of $S_2$ are grounded, representing the lower and upper temperature limits, respectively (with the other switch at the non-grounded position. The two non-grounded contacts of the limit switches (one each) are tied together and to one end of alternative lead 10. At its other end that lead is connected through on-off switches $S_3$ and $S_4$ in series to one side of a source of electrical potential, here battery B, the other side of which is grounded. One of the latter switches is manually operable as a main on-off switch, while the other one is a normally open protective switch that precludes operation of the signalling devices until the temperature of the heated bituminous material approaches operating conditions sufficiently closely—although still outside (e.g., 15° below) tolerance limits—to warrant signalling, as during initial warmup. Located in circuit between the arms of switches $S_1$ and $S_2$ are diodes $D_1$ and $D_2$ conducive to flow of current therethrough whenever the switches are closed to ground. Parallel branches interconnecting the switch arms contain, in the first branch, diode $D_3$ and lamp $A_1$ and, in the second branch, diode $D_4$ and lamp $A_2$. Bell $A_3$ is connected in series with bimetal (or equivalent delay-actuated) switch $S_5$ in the lead from the battery to the first mentioned diodes.

Operation of the apparatus of FIG. 3 is readily understood. With all switches in the positions shown in solid lines, if the temperature of the molten bituminous material falls, the thermostat linkage (broken lines) to the arm of limit switch $S_1$ moves it to the left until it encounters its lower limit contact, whereupon electrical current flows from the battery to ground, initially through bell $A_3$, delay switch $S_5$, diode $D_1$, and switch $S_1$. After a brief bell-ringing period, delay switch $S_5$ opens the circuit, whereupon the bell stops ringing until, after a further delay period the delay switch closes again. When switch $S_5$ is open, current flows from the battery through closed on-off switches $S_3$, $S_4$ and lead 10 through the closed contact of switch $S_2$. That current continues through the first branch, including diode $D_3$ and lamp $A_1$ contained therein, to ground through switch $S_1$. Lamp $A_1$, which is an indicator of low temperature, remains on as long as the thermostat is responding to a temperature outside the acceptable minimum limit. Oppositely connected diode $D_4$ prevents current flow through the second branch in the low-temperature limit position.

When the temperature exceeds the maximum limit the thermostat closes switch $S_2$ at its right or upper limit contact, whereupon bell $A_3$ is actuated again, but lamp $A_2$, preferably red to indicate excessively high temperature, is actuated by flow of current through it and diode $D_4$ in the second branch between the closed switch contacts. No current flows in the first branch under such conditions because of the opposite polarity of diode $D_3$. Throughout the operation the recorder, which suitably is of spring driven type operatively connected to the thermostat, charts the temperature of the molten bituminous material undergoing heating.

It will be understood that use of such signals will alert persons engaged in the roofing operation to make appropriate adjustment in their operations so as to ensure a satisfactory work product. This may necessitate interrupting application of molten bituminous material to the roof deck during an out-of-limits condition, which may come about despite automatic adjustment of the heater by a control thermostat as already described, and also whenever a human control link between thermostat and heater is relied upon for readjusting of heater controls.

In general, of course, it is advisable to reduce insofar as possible the opportunity for molten bituminous material to cool from the moment it is removed from the heating location until it constitutes a layer on the deck overlaid by a layer of roofing material, such as felt having a base of wood fibers or glass fibers, insulation composed of cellular polyurethane, or other suitable material. Adiabatic transporting of the molten bituminous material, spreading thereof without undue division into separate batches, and minimization of the time required for transporting and spreading the material and for covering it with the next layer of roofing material are preferred. No degree of improvement in those related conditions, however, can eliminate the dependence upon characteristics of the materials used and upon ambient conditions, all of which this invention takes into account.

The heating temperature under ambient and related conditions at which satisfactory roofing operations are feasible will be between about 300° F and 500° F. When the bituminous material is asphalt, the temperature range within which such temperature is located narrows to about 350° F to 500° F, while for pitch the range is from about 300° to 425° F. Below the lower end of the range for either of these materials poor adhesion results from insufficient spreadability and penetrability, even assuming adiabatic conditions from melting to covering on the roof deck, whereas above the upper end of the range the melt thins out and may even undergo coking, wherein the liquid components essential to high adherence become solidified or otherwise altered and lose their adherent quality to a greater or lesser extent. Satisfactory adhesion temperature depends also, in substantial part, upon the roofing felt or insulation that is being used, as is well known to persons ordinarily skilled in the art, who are guided by recommendations of the manufacturers with regard thereto.

Recommended minimum temperature usually is at least 350° F, although 300° F may be permitted with certain combinations of materials.

Tolerance limits upon temperature of the molten bituminous material are preferably within ±25° (F) or even within a narrower range, such as ±15°. In general, the closer the melt temperature is maintained the better the resulting roof will be, so long as the heating temperature is adjusted, in the event of changing conditions, to provide suitable adhesion on the roof deck. Control apparatus and procedure should have prompt response characteristics, of course, and be free from underdamping, such as would result in hunting about the optimum, and from overdamping, such as would result in a stuttering (and perhaps prolonged) approach thereto.

Notwithstanding the foregoing description and illustration of preferred apparatus and methods, modifications may be made, as by adding, combining, or subdividing parts or steps, or by substituting equivalents while maintaining advantages of the invention, which itself is defined in the following claims.

The claimed invention:

1. In formation of built-up roofs using molten bituminous material to adhere layers of roofing material, the improvement comprising heating bituminous material to melt it, sensing the temperature of the bituminous material being heated, sensing the temperature of molten bituminous material on the roof deck, and adjusting the heating temperature so that the temperature of the molten bituminous material applied to the deck will be within a predetermined satisfactory adhesion temperature range.

2. Roof formation according to claim 1, wherein the bituminous material is asphalt and the heating temperature of the melt thereof is maintained within about ±25° F of a preselected temperature between about 350° F and 500° F.

3. Roof formation according to claim 1, wherein the bituminous material is pitch and the heating temperature of the melt thereof is maintained within about ±25° F of a selected temperature between about 300° F and 425° F.

4. Roof formation according to claim 1, including signalling whenever the temperature of the molten bituminous material exceeds the tolerance limits in either direction.

5. Roof formation according to claim 4, wherein the signalling includes a visual signal indicative of whether the temperature is too high or too low, and an audible signal indicative of each such extreme.

6. In formation of built-up roofs, requiring determination of heating temperature in melting of bituminous material for adhering adjacent layers of roofing material, the improvement comprising selecting the composition of roofing material to be used, sensing ambient conditions including roof deck temperature conducive to temperature change of the molten bituminous material, and basing the heating temperature in predetermined manner upon such material composition and upon such ambient conditions conducive to such temperature change.

7. Roofing process according to claim 6, wherein the desired temperature is adjusted higher for asphalt than for pitch as the bituminous material, higher for roofing material of low conductivity than for roofing material of relatively high conductivity, and higher for low deck temperature than for relatively high deck temperature.

8. In formation of built-up roofs, for which bituminous material is heated to a controlled temperature preparatory to application thereof to a roof deck, the improvement comprising sensing the temperature of the roof deck and taking the sensed temperature into account in controlling the heating temperature of the bituminous material to optimize on-deck adhesion.

9. In formation of built-up roofs, for which bituminous material is heated to a controlled temperature preparatory to application thereof to a roof deck, the improvement comprising sensing the temperature of the roof deck and the ambient air temperature and taking the sensed temperatures into account in controlling the heating temperatures of bituminous material to optimize on-deck adhesion.

* * * * *